Patented Nov. 1, 1938

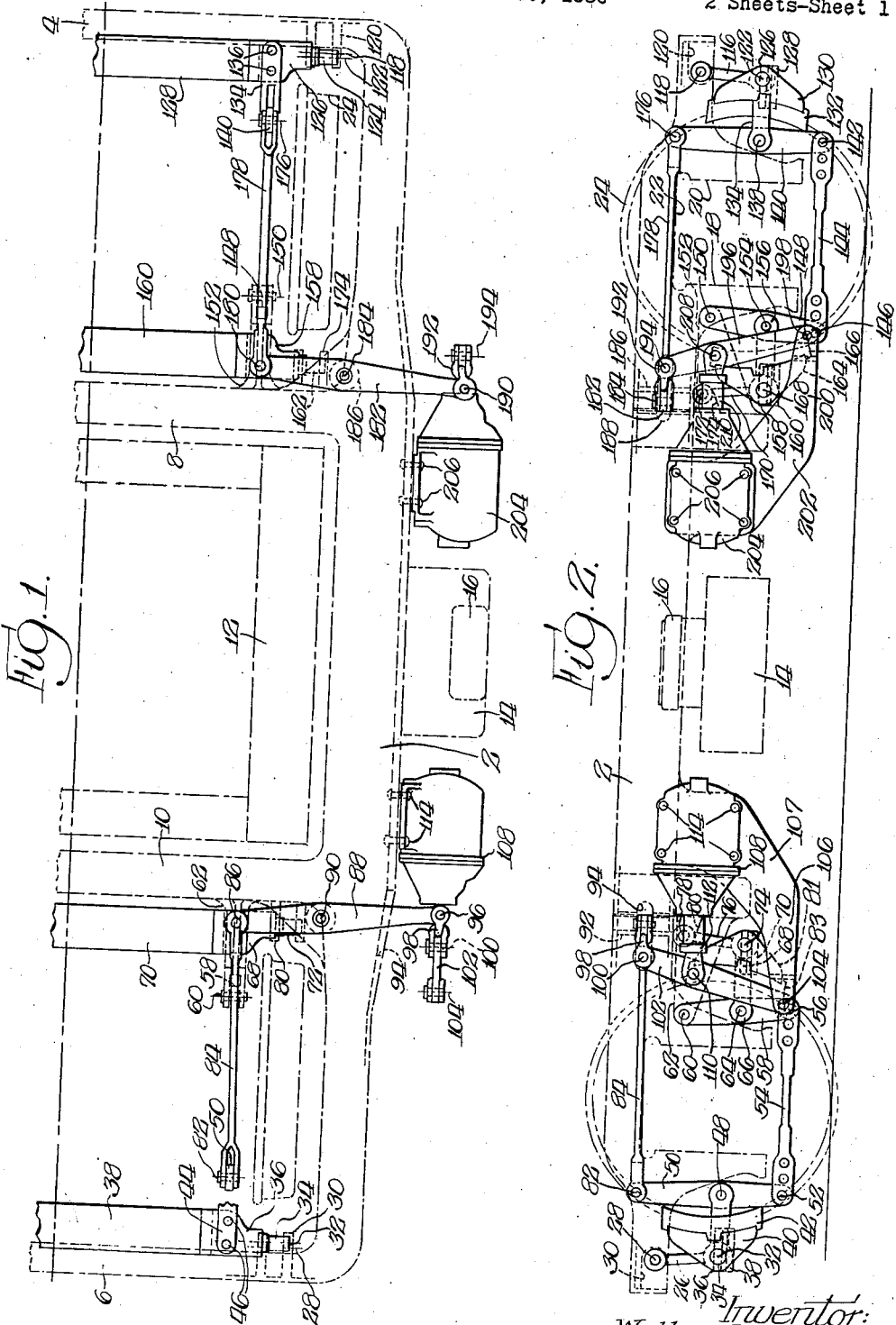

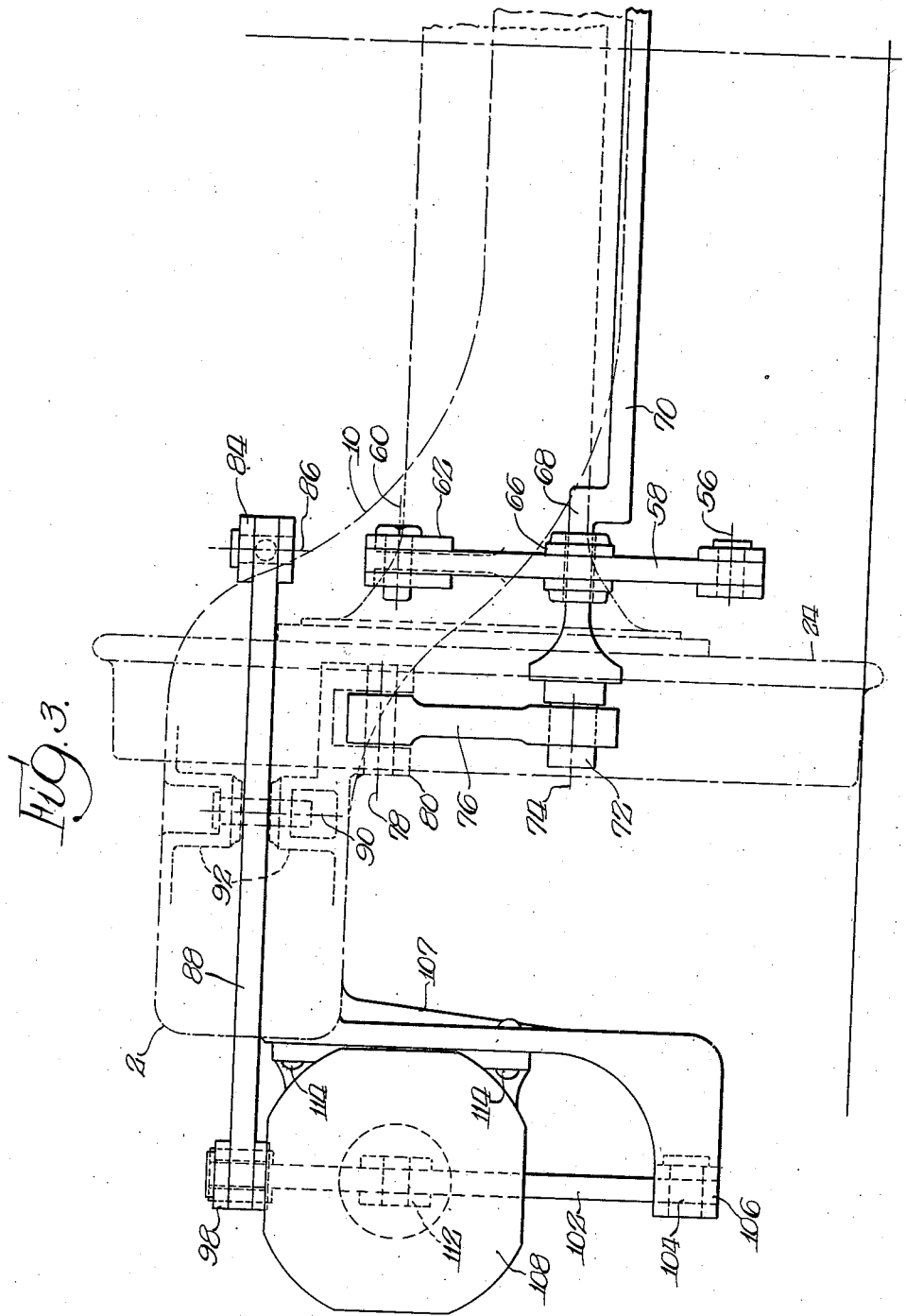

2,135,438

UNITED STATES PATENT OFFICE 2,135,438

CLASP BRAKE

Walter H. Baselt, Chicago, Ill., assignor to American Steel Foundries, Chicago, Ill., a corporation of New Jersey Application December 16, 1936, Serial No. 116,100

29 Claims. (Cl. 188—56)

This invention relates to brake rigging for a four wheel railway car truck.

The development of new high speed railway trains has made necessary designs of trucks having long wheel bases, particularly where it is desirable to support adjacent ends of two cars on one railway truck. In addition, the increased rate of speed has made it desirable to lower the center of gravity of the cars as much as practicable in order to increase their stability. An additional means of increasing the stability of car bodies of high speed trains is provided in the form of side bearings outboard of the truck frame.

It is an object of my invention to provide a satisfactory and economical form of brake rigging for a four wheel railway car truck designed for such use as above described.

A further object of the invention is to provide a brake rigging of the clasp type for a railway car truck having a long wheel base wherein the bolster or load carrying member is provided with side bearings outboard of the truck side frames.

Yet another object of my invention is to provide brake rigging for a four wheel railway car truck wherein power means will be mounted on the side frame for independent operation of rigging at the respective ends of the truck.

A more definite object of my invention is to provide a brake rigging for a long wheel base truck for a high speed train wherein the power means for said rigging is mounted on said truck and wherein said rigging includes transverse levers, all of said transverse levers being below the upper lever of the side frame of said truck.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a top plan view of a railway car truck embodying my invention;

Figure 2 is a side elevation of the truck and brake structure shown in Figure 1; and Figure 3 is a sectional view taken substantially in the plane bisecting transversely the truck structure shown in Figures 1 and 2, looking toward the left.

For the sake of clarity and simplicity certain details are omitted from each of these views when the structure and arrangement is made clear by other views.

Describing the structure in more detail, the truck frame comprises side frames 2 integrally formed with the end rails 4 and 6 and with the spaced transoms 8 and 10 serving as supports for the span bolster 12 which is received therebetween. Carried upon the span bolster 12 is the center bolster of usual form having the projecting end 14 upon which is mounted the side bearing 16, said projecting end 14 extending below the side frame 2. Adjacent each end the side frame is provided with guide columns 18 and 20 forming the opening 22 within which may be received in the usual manner the journal portion (not shown) of the wheel and axle assembly 24.

The brake rigging comprises the hanger 26 (Figure 2, left) pivotally supported at its upper end as at 28 from the bracket 30 integrally formed on the truck frame adjacent the juncture of the end rail 6 with the side frame 2. The lower end of the hanger 26 is pivotally connected as at 32 on the trunnion end 34 formed on the adjacent end 36 of the brake beam 38, and likewise on said trunnion end 34 is pivotally mounted the brake head 40 carrying the brake shoe 42 and arranged for cooperative engagement with the periphery of the adjacent wheel. Adjacent each end of the brake beam 38 and on the offset portion 36 is supported the fulcrum 44 as by means of rivets 46—46, the outer end of said fulcrum having a pivotal connection as at 48 with the live truck lever 50 at a point intermediate the ends of said lever. The lower end of the live truck lever 50 is pivotally and adjustably connected as at 52 to the pull rod 54, the opposite end of said pull rod having a pivotal and adjustable connection as at 56 to the lower end of the dead truck lever 58, the upper end of said dead truck lever being pivotally supported as at 60 from the bracket 62 integrally formed on the transom 10 inwardly of its juncture with the side frame 2. Intermediate the ends of the dead lever 58 as at 64 is pivotally connected the outer end of the fulcrum 66, said fulcrum being secured on the offset end 68 of the brake beam 70 in the manner just described for the fulcrum 44 mounted on the brake beam 38. To the trunnion end 72 of the brake beam 70 is pivotally connected as at 74 the lower end of the supporting hanger 76, the upper end of said hanger being pivotally supported as at 78 from the bracket 80 integrally formed on the frame adjacent the juncture of the transom 10 with the side frame 2. On the trunnion end 72 of the brake beam 70 is also pivotally supported the brake head 81 carrying the brake shoe 83 and arranged for cooperative engagement with the opposite periphery of the last mentioned wheel.

The upper end of the live truck lever 50 has a pivotal connection as at 82 with the pull rod 84, the opposite end of said pull rod having a pivotal connection as at 86 with the inner end of the dead horizontal lever 88, said horizontal lever being fulcrumed intermediate its ends as at 90 from the bracket 92 integrally formed with the truck frame at the juncture of the transom 10 with the side frame 2. The horizontal lever 88 extends through the opening 94 formed on a horizontal plane through the side frame 2. The outer end of the horizontal lever 88 has a pivotal connection as at 96 to the clevis means 98, the opposite end of said clevis means having pivotal connection as at 100 with the upper end of the cylinder lever 102. The lower end of the cylinder lever is fulcrumed as at 104 from the extended arm 106 of the bracket 107 integrally formed with the side frame 2, said bracket providing the mounting means for the power means or truck cylinder 108. Intermediate its ends the cylinder lever 102 is pivotally connected as at 110 to the piston 112 of the power means or brake cylinder 108, said power means being secured to the before mentioned bracket 106 as by means of rivets 114.

At the opposite end of the truck the hanger 116 (Figure 2, right) is pivotally supported from its upper end as at 118 from the bracket 120 integrally formed with the frame at the juncture of the end rail 4 with the side frame 2. The lower end of the hanger 116 is pivotally connected as at 122 to the trunnion end 124 formed on the offset portion 126 of the brake beam 128 and likewise on said trunnion portion 124 is pivotally mounted the brake head 130 supporting the brake shoe 132 for cooperation with the outer periphery of the adjacent wheel. On the offset portion 126 of the brake beam 128 is secured the fulcrum 134 as by means of rivets 136. The outer end of the fulcrum 134 is pivotally connected as at 138 to a point intermediate the ends of the live truck lever 140, the lower end of said live truck lever having a pivotal and adjustable connection as at 142 to the pull rod 144, the opposite end of said pull rod having a pivotal and adjustable connection as at 146 to the lower end of the dead truck lever 148, the upper end of said dead truck lever having a pivotal support as at 150 on the fulcrum bracket 152 integrally formed with the transom 8 inwardly of its juncture with the side frame 2. Intermediate the ends of the dead truck lever 148 as at 154 is pivotally connected the fulcrum 156, said fulcrum being secured on the offset end 158 of the brake beam 160 in the manner previously described for the fulcrum 134 on the beam 128. At the trunnion end 162 of the brake beam 160 is pivotally supported the brake head 164 carrying the brake shoe 166 in position for cooperation with the inner periphery of the last mentioned wheel. Likewise on said trunnion end as at 168 is pivotally connected the lower end of the hanger 170, the upper end of said hanger having a pivotal support as at 172 from the bracket 174 integrally formed on the transom 8 adjacent its juncture with the side frame 2.

The upper end of the live truck lever 140 has a pivotal connection as at 176 with the pull rod 178, the opposite end of said pull rod having the pivotal connection as at 180 with the inner end of the dead horizontal lever 182, said dead horizontal lever being fulcrumed intermediate its ends as at 184 from the bracket 186 integrally formed with the frame at the juncture of the transom 8 with the side frame 2. The dead horizontal lever 182 is fulcrumed within the horizontal opening 188 which extends through the side frame and the outer end of said dead horizontal lever is pivotally connected as at 190 to the clevis means 192, the opposite end of said clevis means having pivotal connection as at 194 to the cylinder lever 196, the lower end of said cylinder lever being fulcrumed as at 198 from the extended arm 200 forming a portion of the bracket 202 which provides support for the power means 204, said power means being secured thereto as by rivets 206, said bracket structure being similar to that previously described as supporting the power means 108 at the opposite end of the truck. Intermediate its ends as at 208 the cylinder lever 196 is pivotally connected to the piston 210 on the power means or brake cylinder 204.

The structure and operation of the rigging at opposite ends of the truck is the same and therefore the method of operation will be described for only one end. The power means of course are actuated in unison and accordingly the rigging at both ends of the truck operate simultaneously. The following description is given for the rigging at the left end of the truck as viewed in Figures 1 and 2.

Assuming that the rigging is in inoperative position, actuation of the power means 108 will cause the piston 112 to move to the left, thus rotating the cylinder lever 102 in a counterclockwise direction about the fulcrum 104 at its lower end and through the clevis connection 98 causing the dead horizontal lever 88 to rotate in a clockwise direction about its pivotal point of support 90 intermediate the ends of said lever. Clockwise rotation of said horizontal lever 88 causes the pull rod 84 to move to the right, thus rotating the live truck lever 50 in a clockwise direction about the pivot 52 at its lower end and moving the brake beam 38 to the right and bringing the brake shoe 42, carried thereon, into engagement with the outer periphery of the adjacent wheel. Continued actuation of the power means causes the live truck lever 50 to rotate in a clockwise direction about the pivot 48 intermediate its ends, thus moving the pull rod 54 to the left and rotating the dead truck lever 58 in a clockwise direction about the fulcrum point 60 at its upper end and moving the brake beam 70 to the left until the brake shoe 83, carried thereon, is brought into engagement with the inner periphery of said wheel.

Release of the power means will cause the parts to move in directions reverse to those just described until they have assumed their normal inoperative position. It will be understood that the parts operate substantially simultaneously and not successively as herein described for the sake of clarity.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a brake rigging for a four wheel railway car truck the combination of a truck frame having side members and a transverse load carrying member projecting outwardly of said side members, wheel and axle assemblies disposed in supporting relation to said truck frame, brake beams disposed on opposite sides of each wheel and axle assembly, dead truck levers connected to the beams inwardly of the wheels, live truck levers connected to the beams outwardly of the wheels, spaced horizontal levers fulcrumed on said side members on opposite sides of said load carrying member and having their inner ends connected respectively to said live truck levers, vertical cylinder levers having their lower ends fulcrumed from said side members and their upper ends connected respectively to said horizontal levers, and spaced power means supported on said side members and directly connected respectively to said cylinder levers.

2. In a railway car truck the combination of a truck frame comprising spaced side members, spaced transverse members integrally formed with side members, a wheel and axle assembly, power means mounted on each of said side members, and brake rigging comprising brake beams supported on opposite sides of said assembly, dead levers connected to the beams inwardly of said assembly, live levers connected to the beams outwardly of said assembly, connections between said live and dead levers adjacent each wheel, horizontal levers fulcrumed on said side members and having their inner ends connected respectively to said live truck levers, and cylinder levers having their upper ends connected to said horizontal levers, points intermediate their ends connected to said power means respectively, and their lower ends fulcrumed from said side member.

3. In brake rigging for a railway car truck the combination of a truck frame comprising side members, a wheel and axle assembly disposed in supporting relation to said truck frame, power means mounted on each of said side members, hangers supporting brake beams on opposite sides of said assembly, operative connections between said beams, said connections including dead levers connected to one of said beams, live levers connected to the other of said beams, and connections between said levers adjacent each wheel, auxiliary levers fulcrumed from said side members and connected respectively to said live levers, vertical levers fulcrumed at their lower ends from said side members and connected respectively to said auxiliary levers, and operative connections respectively between said vertical levers and said power means.

4. In a brake rigging for a railway car truck the combination of a truck frame comprising a side member and a load carrying member having a side bearing outwardly of said side member, wheel and axle assemblies disposed in supporting relation to said truck frame, a transverse opening in said side member adjacent each of said assemblies, power means mounted on said side member adjacent each of said openings, braking means disposed for cooperation with the wheels at the opposite ends of said truck, spaced horizontal levers fulcrumed in said openings and having their inner ends connected to the braking means at opposite ends of the truck, vertical levers fulcrumed from said side member adjacent each of said power means and having their upper ends connected respectively to said horizontal levers, and connections between said power levers respectively and said vertical levers.

5. In a four wheel railway car truck the combination of a truck frame comprising side members, power means mounted on each of said side members outwardly thereof, a wheel and axle assembly disposed in supporting relation to said truck frame, braking means disposed for cooperation with the wheels of said assembly and comprising brake beams disposed at opposite sides thereof, dead truck levers fulcrumed from said truck frame and connected to the beam inwardly of said wheels, live truck levers connected to the beam outwardly of said wheels, connections between the live and dead truck levers of each pair, horizontal levers fulcrumed on said side members and connected respectively to said live truck levers, said horizontal levers projecting through said side members respectively, and vertical levers fulcrumed on said side members and having their upper ends connected respectively to said horizontal levers and connected intermediate their ends to said power means respectively.

6. In a brake rigging for a four wheel railway car truck the combination of a truck frame comprising side members and a transverse load carrying member having side bearings outwardly of said side members, a plurality of power means mounted on each of said side members on opposite sides of said side bearings, wheel and axle assemblies disposed in supporting relation to said truck frame, braking means supported for cooperation with the wheel and axle assemblies at the respective ends of said truck, spaced horizontal levers mounted on each of said side members and having their inner ends connected to said braking means at the opposite ends of the truck, vertical levers fulcrumed from said side members adjacent each of said power means and connected thereto respectively, and operative connections between said vertical levers respectively and the adjacent horizontal levers.

7. In a brake rigging for a four wheel railway car truck the combination of a truck frame comprising side members, spaced wheel and axle assemblies, braking means supported from said frame for cooperation with the wheels of said assemblies at the respective ends of the truck, pairs of horizontal levers fulcrumed from said frame and projecting through said side members, said horizontal levers having their inner ends connected to opposite sides of the braking means at the opposite ends of the truck, a plurality of power means mounted on each of said side members, pairs of cylinder levers fulcrumed from said side members and connected respectively to the adjacent power means, and clevis means connecting the upper ends of said cylinder levers respectively to the adjacent horizontal levers.

8. In a four wheel railway car truck the combination of a truck frame comprising side members, integrally formed end rails, spaced transoms, and a transverse load carrying member having side bearings outwardly of said side members, wheel and axle assemblies disposed in supporting relation to the truck frame at the opposite ends thereof, braking means disposed for cooperation with the wheels at the opposite ends of the truck, spaced power means mounted on each of said side members on opposite sides of said side bearings, and transversely arranged auxiliary levers fulcrumed on said side members and having their inner ends connected to the opposite sides of braking means at opposite ends of the truck respectively, vertical levers fulcrumed on said side members and connected to said power means respectively, and operative connections between each of said vertical levers and the adjacent auxiliary lever.

9. In a four wheel railway car truck the combination of a truck frame comprising a side member and a transverse load carrying member having an end projecting outwardly of said side member, spaced power means mounted on said side member on opposite sides of said projecting end, spaced wheel and axle assemblies disposed in supporting relation to said truck frame at opposite ends thereof, braking means arranged for cooperation with the wheels at opposite ends of the truck, vertical levers fulcrumed from said side member and connected intermediate their ends respectively to said power means, and auxiliary levers fulcrumed on said side member adjacent said power means and having their outer ends connected respectively to the upper ends of said vertical levers, and their inner ends connected respectively to said braking means.

10. In a four wheel railway car truck the combination of a truck frame having a side member and a load carrying member projecting outwardly thereof, spaced wheel and axle assemblies, spaced power means mounted on said side member on opposite sides of said load carrying member, brake riggings associated with each of said wheel and axle assemblies, vertical levers fulcrumed from said side member, spaced horizontal levers fulcrumed from said frame and connected respectively to said vertical levers, and operative connections respectively between said power means and said vertical levers and between said horizontal levers respectively and said brake riggings.

11. In a railway car truck the combination of a truck frame comprising a side member and a load carrying member having a side bearing outwardly of said side member, spaced wheel and axle assemblies disposed in supporting relation to said truck frame, power means mounted on said side member on opposite sides of said side bearing, spaced horizontal levers fulcrumed on said side member and having their inner ends connected respectively to braking means associated with said assemblies, and vertical levers fulcrumed at their lower ends from said side member and having their upper ends connected respectively to said horizontal levers and connected intermediate their ends respectively to said power means.

12. In a brake rigging for a railway car truck the combination of a truck frame comprising side members, a wheel and axle assembly disposed in supporting relation to said truck frame, braking means supported for cooperation with the wheels of said assembly, power means mounted on said side members outwardly thereof, vertical levers fulcrumed from said side members and connected intermediate their ends to said power means respectively, horizontal openings through said side members adjacent said power means respectively, and auxiliary levers fulcrumed in said openings and serving as connection means between said braking means and said vertical levers respectively.

13. In a four wheel railway car truck the combination of a truck frame comprising side members, power means mounted on each of said side members outwardly thereof, a wheel and axle assembly disposed in supporting relation to said truck frame, braking means disposed for cooperation with the wheels of said assembly and comprising brake beams disposed at opposite sides thereof, dead truck levers fulcrumed from said truck frame and connected to the beam inwardly of said wheels, live truck levers connected to the beam outwardly of said wheels, connections between the live and dead truck levers of each pair, and horizontal levers fulcrumed on said side members and connected respectively to said live truck levers, said horizontal levers projecting through said side members respectively for operative connection to said power means.

14. In a brake rigging for a railway car truck the combination of a truck frame comprising a side member, a wheel and axle assembly disposed in supporting relation to said truck frame adjacent one end thereof, braking means disposed for cooperative relation with the wheels of said assembly, power means mounted on said side member outwardly thereof, a horizontal opening in said side member adjacent said power means, and an auxiliary lever fulcrumed in said opening and having its inner end operatively connected to said braking means and its outer end projecting through said opening for operative connection to said power means.

15. In a brake rigging for a railway car truck the combination of a truck frame comprising side members, a wheel and axle assembly disposed in supporting relation to said truck frame, horizontal openings through said side members, dead levers fulcrumed in said openings and having their inner ends connected to brake rigging disposed for cooperation with said wheel and axle assembly, vertical levers fulcrumed from said side members and having their upper ends connected respectively to the outer ends of said dead levers, and power means mounted respectively on said side members, the pistons of said power means being connected respectively to points intermediate the ends of said vertical levers.

16. In a railway car truck the combination of a truck frame comprising side members, a wheel and axle assembly, openings in said side members adjacent the wheels of said assembly, dead levers fulcrumed respectively in said openings and having their inner ends connected to braking means disposed for cooperation with said wheels, power means disposed on said side members adjacent said openings, cylinder levers fulcrumed from said side members and connected intermediate their ends to said power means respectively, and operative connections respectively between said cylinder levers and said dead levers.

17. In a railway car truck the combination of a truck frame comprising side members, a wheel and axle assembly disposed to support said truck frame, braking means supported for cooperation with said wheel and axle assembly, bracket means disposed on each of said side members adjacent the respective wheels of said assembly, power means mounted on each of said bracket means, auxiliary levers fulcrumed on said frame and having their inner ends connected to opposite sides of said braking means, cylinder levers fulcrumed from said bracket means and connected intermediate their ends respectively to said power means, and operative connections between said cylinder levers respectively and said auxiliary levers.

18. In a railway car truck the combination of a truck frame comprising side members and integrally formed end rails, spaced wheel and axle assemblies, spaced bracket means secured to each of said side members, power means on said side members adjacent each of said bracket means, braking means disposed for cooperation with the wheels of said assemblies, spaced auxiliary levers fulcrumed on said frame adjacent said power means respectively and having their inner ends connected to opposite sides of said braking means respectively, vertical levers fulcrumed from said bracket means and connected respectively to said auxiliary levers, and operative connections between said vertical levers respectively and said power means.

19. In a brake rigging for a railway car truck the combination of a truck frame comprising side members, a wheel and axle assembly disposed in supporting relation to said truck frame, braking means supported for cooperation with the wheels of said assembly, horizontal openings through said side members, power means mounted on said side members outwardly thereof, auxiliary levers fulcrumed in said openings and having their inner ends connected to the opposite ends respectively of said braking means, and operative connections respectively between said power means and said auxiliary levers.

20. In a brake rigging for a railway car truck the combination of a truck frame comprising side members, a wheel and axle assembly disposed in supporting relation to said truck frame, braking means supported for cooperation with the wheels of said assembly, power means mounted on said side members outwardly thereof, horizontal openings through said side members adjacent said power means respectively, and auxiliary levers fulcrumed in said openings respectively and serving as connection means between said power means and said braking means.

21. In a railway truck, a framework including side frames, a wheel and axle assembly, brackets on said side frames, power means mounted on said brackets, braking means associated with said wheel and axle assembly, horizontal levers fulcrumed on said side members and connected at their inner ends to opposite sides of said braking means, and cylinder levers fulcrumed from said brackets and connected intermediate their ends respectively to said power means and at their upper ends to said horizontal levers.

22. In a railway truck, a framework including side members having brackets thereon, power means mounted on said brackets, a wheel and axle assembly, clasp brake means associated with said assembly, horizontal levers fulcrumed on said framework and connected at their inner ends to opposite sides of said braking means, and vertical levers fulcrumed from said brackets and connected intermediate their ends to said power means respectively and at their upper ends to adjacent horizontal levers.

23. In a railway car truck a framework including side members having brackets, power means mounted on said brackets, a wheel and axle assembly, clasp brake means associated with said assembly, auxiliary levers fulcrumed in said side members and connected at their inner ends to opposite sides of said braking means, and cylinder levers fulcrumed respectively from said brackets and connected intermediate their ends to said power means, said cylinder levers having their upper ends connected respectively to said auxiliary levers.

24. In a four wheel railway truck, a framework including side members having brackets, power means mounted on said brackets, horizontal openings through said side members, a wheel and axle assembly, clasp brake means associated with said wheel and axle assembly, auxiliary levers fulcrumed respectively in said openings and connected at opposite sides of said braking means, cylinder levers fulcrumed from said brackets and connected intermediate their ends to said power means respectively, and an operative connection between each of said cylinder levers and the adjacent auxiliary lever.

25. In a four wheel railway car truck, a framework comprising a side frame, brackets on said side frame, power means on said brackets, wheel and axle assemblies, clasp brake means associated with each of said assemblies, dead levers fulcrumed on said side frame and connected respectively to said braking means at opposite ends of the truck, cylinder levers fulcrumed respectively from said brackets and connected intermediate their ends to said power means, and operative connections between said cylinder levers and said dead levers respectively.

26. In a four wheel railway car truck, a truck frame including side members, power means and fulcrum means on said side members, a wheel and axle assembly, clasp brake means associated with said assembly, dead levers fulcrumed on said side members and connected at their inner ends to opposite sides of said braking means, cylinder levers connected at their lower ends to said fulcrum means respectively and intermediate their ends to said power means, and operative connections between said cylinder levers and said dead levers respectively.

27. In a four wheel railway truck, a framework including side members, horizontal openings in said members, power means and fulcrum means on each of said side members, a wheel and axle assembly, clasp brake means associated with said assembly, dead levers fulcrumed in said openings and connected to said brake means at opposite ends thereof, cylinder levers connected at their lower ends to said fulcrum means and intermediate their ends to said power means respectively, and operative connections between said cylinder levers and said dead levers at opposite sides of the truck.

28. In a four wheel railway truck, a framework including side members, a wheel and axle assembly, brake means associated with said assembly, dead levers fulcrumed on said side members and connected to said brake means at opposite sides of the truck, power means mounted on said side members, fulcrum levers having their lower ends secured to said side members and points intermediate their ends connected respectively to said power means, and operative connections between said fulcrum levers and said dead levers at opposite sides of the truck.

29. In a railway truck, a framework, a wheel and axle assembly disposed in supporting relation thereto, clasp brake means associated with said assembly, dead levers fulcrumed on said framework and connected at their inner ends to opposite sides of said brake means, power means mounted on said framework at opposite sides thereof, fulcrum levers secured at their lower ends to said framework and connected intermediate their ends to said power means respectively, and operative connections between said fulcrum levers and said dead levers at opposite sides of the truck.

WALTER H. BASELT.